United States Patent
Cho et al.

(10) Patent No.: US 8,750,478 B2
(45) Date of Patent: Jun. 10, 2014

(54) APPARATUS AND METHOD OF PROCESSING A GHOST REGISTER

(75) Inventors: Seong Chul Cho, Daejeon (KR); Hyung Jin Kim, Chungcheongnam-Do (KR); Gweon Do Jo, Daejeon (KR); Daeho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 364 days.

(21) Appl. No.: 12/855,219

(22) Filed: Aug. 12, 2010

(65) Prior Publication Data

US 2011/0142220 A1 Jun. 16, 2011

(30) Foreign Application Priority Data

Dec. 15, 2009 (KR) ........................ 10-2009-0124427

(51) Int. Cl.
*H04M 1/56* (2006.01)
*H04M 15/06* (2006.01)
*H04M 3/42* (2006.01)

(52) U.S. Cl.
USPC .................. 379/142.06; 379/210.02; 455/415

(58) Field of Classification Search
USPC ............. 379/142.01, 142.06, 142.07, 207.15, 379/210.02; 455/415
See application file for complete search history.

(56) References Cited

U.S. PATENT DOCUMENTS

| | | | |
|---|---|---|---|
| 6,549,619 B1 * | 4/2003 | Bell et al. | 379/210.02 |
| 6,618,473 B1 * | 9/2003 | Davis | 379/142.05 |
| 6,701,160 B1 * | 3/2004 | Pinder et al. | 455/550.1 |
| 2004/0131164 A1 * | 7/2004 | Gould | 379/88.19 |
| 2005/0129206 A1 * | 6/2005 | Martin | 379/211.01 |
| 2007/0219966 A1 * | 9/2007 | Baylis et al. | 707/3 |
| 2008/0146259 A1 | 6/2008 | Chin et al. | |
| 2008/0254776 A1 * | 10/2008 | Ma | 455/414.1 |

FOREIGN PATENT DOCUMENTS

| | | |
|---|---|---|
| JP | 2007-104725 | 4/2007 |
| KR | 2003-0030516 | 4/2003 |
| KR | 1020040054855 | 6/2004 |
| KR | 1020050050790 | 6/2005 |
| KR | 1020060129762 | 12/2006 |
| KR | 10-2007-0019865 | 2/2007 |
| KR | 1020070019865 A * | 2/2007 |

* cited by examiner

*Primary Examiner* — Quoc D Tran
(74) *Attorney, Agent, or Firm* — Nelson Mullins Riley & Scarborough LLP; Anthony A. Laurentano, Esq.; Lewis Lee, Esq.

(57) ABSTRACT

Provided is a ghost register processing apparatus and method. The ghost register processing apparatus may include a ghost setting determining unit to determine whether a ghost is set with respect to a caller identification (ID) that is received in response to a call request or a message reception and a reception information controller to store reception information associated with the caller ID in a ghost memory unit when the determining determines that the ghost is set.

14 Claims, 2 Drawing Sheets

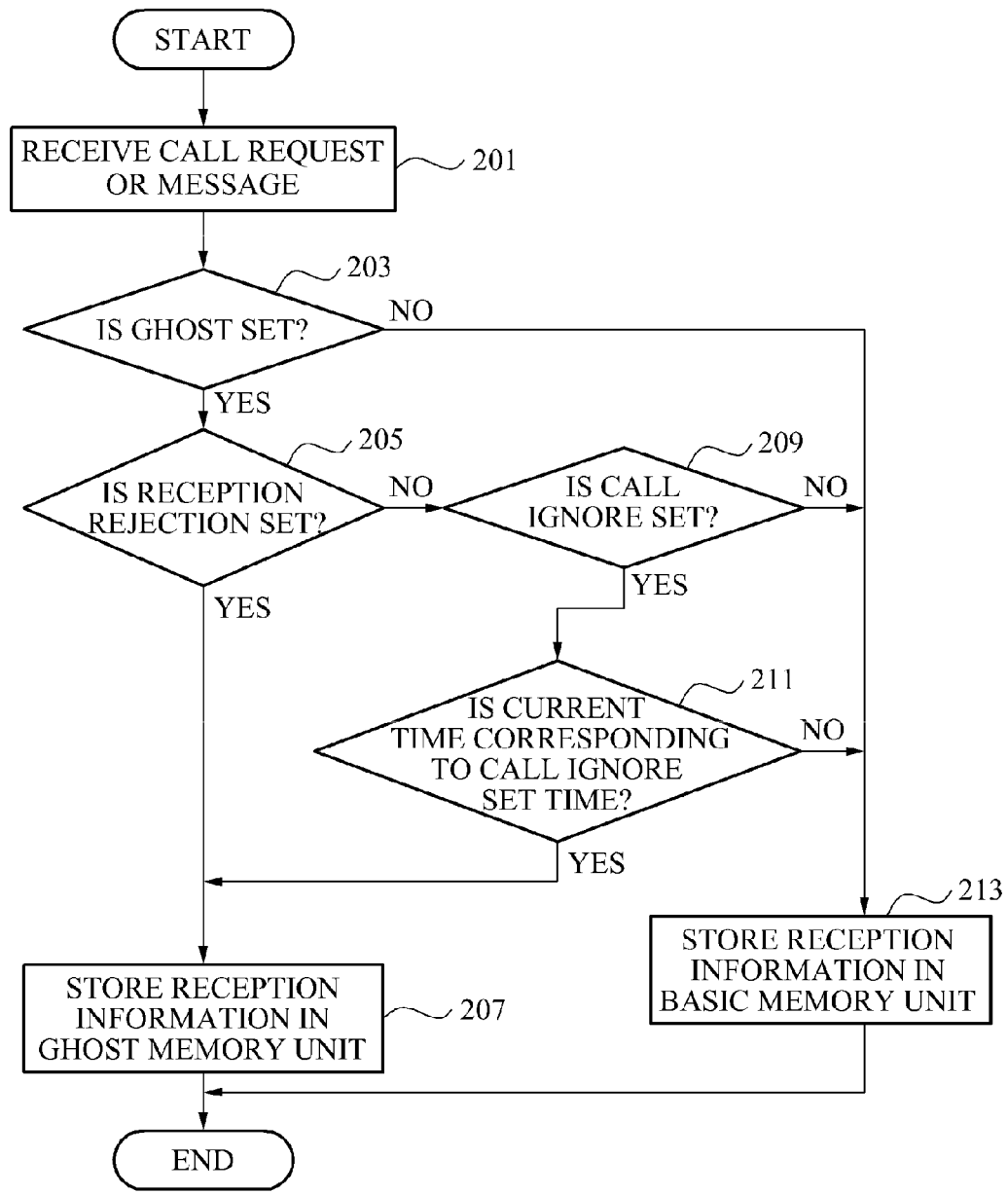

APPARATUS AND METHOD OF PROCESSING A GHOST REGISTER

CROSS-REFERENCE TO RELATED APPLICATION

This application claims the benefit of Korean Patent Application No. 10-2009-0124427, filed on Dec. 15, 2009, in the Korean Intellectual Property Office, the disclosure of which is incorporated herein by reference.

BACKGROUND

1. Field of the Invention

The present invention relates to a ghost register processing apparatus and method, and more particularly, to a ghost register processing apparatus and method that may set a ghost with respect to a predetermined register, manages information associated with the register to whom the ghost is set distinct from information associated with a register to whom the ghost is not set, and thus, may protect information associated with the register to whom the ghost is set.

2. Description of the Related Art

A conventional communication terminal may store a name and a phone number in a desired register. The communication terminal may easily search for the name and the phone number in a register via various search functions and may perform the searching for all registers registered in the terminal. The terminal may easily provide information associated with the registers even when an unauthorized person searches for the information. To protect the information, a recently disclosed communication terminal may be assigned a password in advance, and only when the corresponding password is inputted, may the terminal allow searching for names and phone numbers of registers stored in the terminal. However, when the password is compromised, information associated with the registers may also be revealed to an unauthorized person.

When a call, a voice message, or a text message is received, the conventional communication terminal may store corresponding communication information. Therefore, the conventional communication terminal may not block a call, a voice message, or a text message from a predetermined person or a predetermined group during a predetermined time that the user does not wish to get a call.

Accordingly, there is need for a ghost register processing apparatus and method that may protect a name and a phone number of a predetermine register, in addition to reception information with respect to a call request or a message reception.

SUMMARY

An aspect of the present invention provides a ghost register processing apparatus and method, the ghost register processing apparatus and method may set a ghost with respect to a predetermined register, the register being referred to as a ghost register, may store, in a ghost memory unit, information associated with the ghost register to whom the ghost is set and reception information associated with a ghost register distinct from information associated with a register to whom the ghost is not set and reception information associated with the register, and control to abstain from displaying the information stored in the ghost memory unit, and thus may protect the information associated with the ghost register and the reception information associated with the ghost register.

According to an aspect of the present invention, there is provided a ghost register processing apparatus, the apparatus includes a ghost setting determining unit to determine whether a ghost is set with respect to a caller identification (ID) that is received in response to a call request or a message reception, and a reception information controller to store reception information associated with the caller ID in a ghost memory unit when the determining determines that the ghost is set.

According to an aspect of the present invention, there is provided a register ghost-processing method, and the method includes determining whether a ghost is set with respect to a caller ID received in response to a call request or a message reception, and storing reception information with respect to the caller ID in a ghost memory unit when the determining determines that the ghost is set.

Additional aspects, features, and/or advantages of the invention will be set forth in part in the description which follows and, in part, will be apparent from the description, or may be learned by practice of the invention.

Effect

According to a present invention, a ghost register processing apparatus and method may set a ghost with respect to a predetermined register, the register being referred to as a ghost register, may store, in a ghost memory unit, information associated with the ghost register to whom the ghost is set and reception information associated with a ghost register distinct from information associated with a register to whom the ghost is not set and reception information associated with the register, and control to abstain from displaying the information stored in the ghost memory unit, and thus may protect the information associated with the ghost register and the reception information associated with the ghost register.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 2 is a flowchart illustrating a register ghost-processing method according to an embodiment of the present invention.

DETAILED DESCRIPTION

Figure 1:
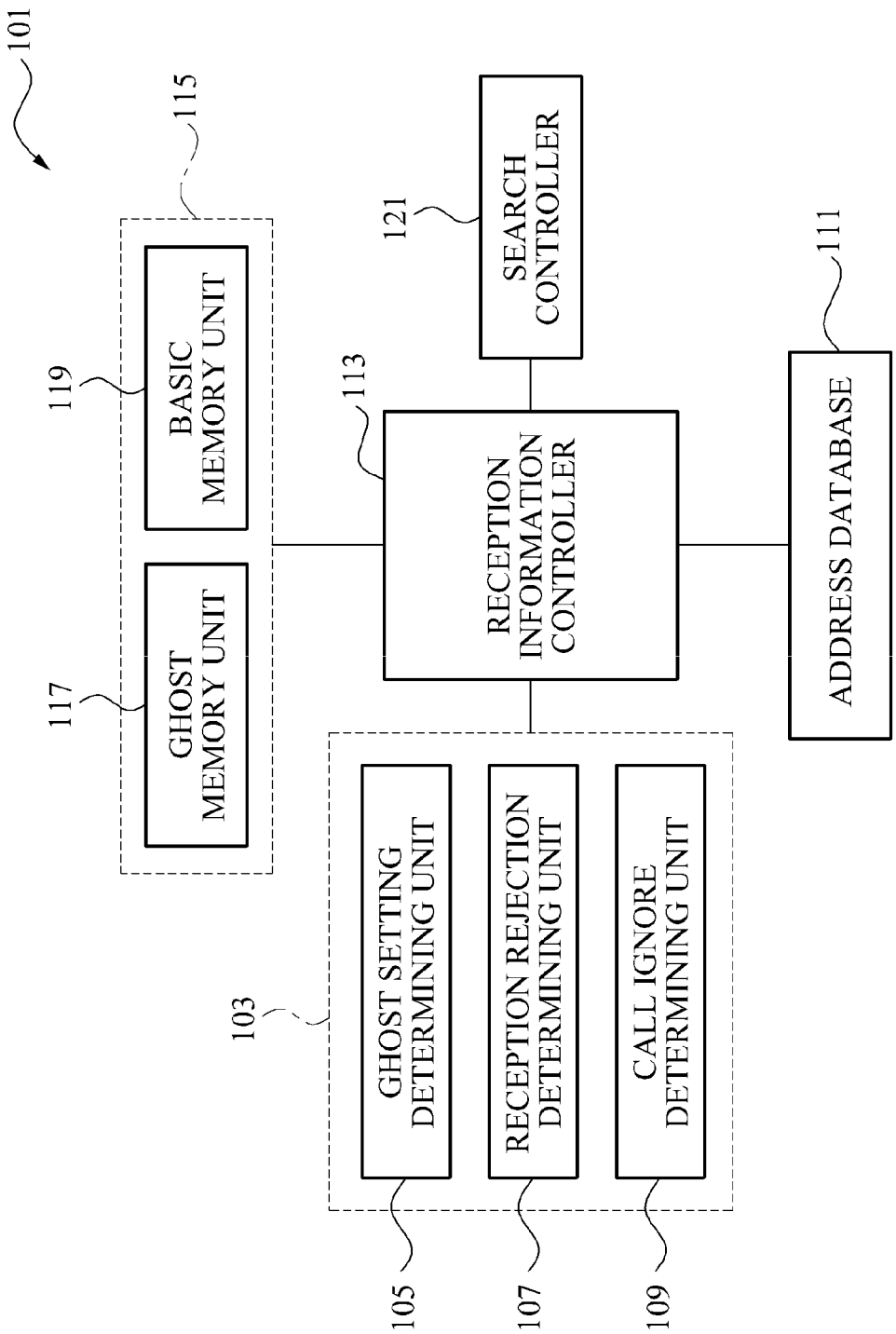
FIG. 1 is a diagram illustrating a configuration of a ghost register processing apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

For ease of description, it is assumed that a register is selected using the ghost register processing apparatus according to an embodiment, and a ghost is set with respect to a caller identification (ID) associated with the selected register.

FIG. 1 illustrates a configuration of a ghost register processing apparatus 101 according to an embodiment of the present invention.

Referring to FIG. 1, the ghost register processing apparatus 101 may include a determining unit 103, an address database 111, a reception information controller 113, a memory unit 115, and a search controller 121.

The determining unit 103 may include a ghost setting determining unit 105, a reception rejection determining unit 107, and a call ignore determining unit 109.

The ghost setting determining unit 105 may determine whether a ghost is set with respect to a caller identification (ID) received in response to a call request or a message reception. The ghost setting determining unit 105 may search an address database 111 to determine whether the ghost is individually set with respect to the caller ID, or may search the address database 111 to determine whether caller ID is included in a group to which the ghost is set. Therefore, the ghost setting determining unit 105 may determine whether the ghost is set with respect to the caller ID.

The reception rejection determining unit 107 may determine whether a reception rejection is set with respect to the caller ID.

The call neglect determining unit 109 determines whether a call neglect is set with respect to the caller ID, when the ghost is set with respect to the caller ID and the reception rejection is not set with respect to the caller ID.

The reception rejection determining unit 107 may search the address database 111 to determine whether the reception rejection is set with respect to the caller ID, and the call neglect determining unit 109 may search the address database 111 to determine whether the call neglect is set with respect to the caller ID.

The address database 111 may store information associated with a register that is stored in advance. The address database 111 may record, as the information associated with the register, at least one among a name of the register, a phone number, information associated with whether the ghost is set, information associated with whether the call neglect is set, and a call neglect set time.

When the ghost is set and the reception rejection is set, the reception information controller 113 may store reception information with respect to the caller ID in a ghost memory unit 117. In this case, the reception information controller 113 may store, in the ghost memory unit 117, reception history or received contents with respect to the call request or the message reception as the reception information.

When the call neglect determining unit 109 determines that the call neglect is set and a current time corresponds to the call neglect set time, the reception information controller 113 may store the reception information of the caller ID in the ghost memory unit 117.

Conversely, when the call neglect determining unit 109 determines that the call neglect is not set or the current time does not correspond to the call neglect set time, the reception information controller 113 may store the reception information of the caller ID in a basic memory unit 119 that is different from the ghost memory unit 117.

The reception information controller 113 may control to display reception information associated with the caller ID stored in the basic memory 119 or may control to activate a notification function with respect to the reception information. Conversely, the reception information controller 113 may control to abstain from displaying the reception information stored in the ghost memory unit or may control to inactivate the notification function with respect to the reception information, and thus, may hide the register to which the ghost is set. This may be performed to protect the reception information associated with a register to whom the ghost is set.

The memory unit 115 may include the ghost memory unit 117 and the basic memory unit 119.

The ghost memory unit 117 may record the reception information associated with the register to which the ghost is set. The register to whom the ghost is set is referred to as a ghost register. The reception information may include the reception history or the received contents with respect to the call request or the message reception.

The basic memory unit 119 may record reception information associated with a register to whom the ghost is not set.

The search controller 121 may search the address database 111 for a ghost register recorded as a character string identical with a character string inputted through an interface (not illustrated), in response to a register search request, excluding a register including a portion of the character string, and may control to display information associated with the retrieved ghost register.

For example, the search controller 121 may search the database 111 for a ghost register 'Hong Gil Dong' recorded as a character string identical with a character string 'Hong Gil Dong' inputted through the interface in response to the register search request, and may control to display information associated with the retrieved ghost register 'Hong Gil Dong'.

Here, in a case where the ghost is set with respect to 'Hong Gil Dong', the search controller 121 may control to display the information associated with the ghost register 'Hong Gil Dong' only when the character string identical to 'Hong Gil Dong' is inputted. However, in a case where the ghost is not set with respect to 'Hong Gil Dong', the search controller 121 may control to display information associated with a register 'Hong Gil Dong' even when a portion of the character string of 'Hong Gil Dong' is inputted. Specifically, in the case where the ghost is set with respect to 'Hong Gil Dong', the search controller 121 may control to display the information associated with the ghost register 'Hong Gil Dong' only when the 'Hong Gil Dong' is inputted, and may control to abstain from displaying the information associated with the ghost register 'Hong Gil Dong' when 'Gil Dong' or 'HGD' is inputted. However, in the case where the ghost is not set with respect to the 'Hong Gil Dong', the search controller 121 may control to display the information associated with the register 'Hong Gil Dong', even when 'Gil Dong' or 'HGD' is inputted, as well as the 'Hong Gil Dong'.

The search controller 121 may control to display reception information stored in the basic memory 119 in response to reception information request with respect to the register to whom the ghost is not set. However, the search controller 121 may control to abstain from displaying the reception information stored in the ghost memory unit 117, and thus, may protect the reception memory associated with the register to whom the ghost is set (ghost register). Conversely, the search controller 121 may control to display the reception information stored in the ghost memory unit 117 in response to the reception information request with respect to the ghost register.

The ghost register processing apparatus according to an embodiment may be a communication terminal that supports a phone call, and may protect information associated with a ghost register and reception information associated with the ghost register by setting a ghost.

When a ghost is set and a reception rejection is set, or when a current time is corresponding to a call neglect set time in a case where the ghost is set, the reception rejection is not set, and a call neglect is set, the ghost register processing apparatus according to an embodiment may store reception information with respect to a caller ID. However, the ghost register processing apparatus may not be limited thereto. For example, when the ghost is set, the ghost register processing apparatus according to an embodiment may store reception information with respect to a caller ID, and may control to abstain from displaying information stored in the ghost memory unit, thereby may protect the reception information with respect to the ghost register.

FIG. 2 illustrates a ghost-processing method with respect to a register according to an embodiment of the present invention.

Referring to FIG. 2, the ghost register processing apparatus receives a call request or a message in operation 201.

The ghost register processing apparatus determines whether a ghost is set with respect to a caller ID received in response to the call request or a message reception in operation 203.

In this case, the register ghost processing apparatus may search an address database to determine whether the ghost is individually set with respect to the caller ID, or may search the address database to determine whether the caller ID is included in a group to which the ghost is set. Therefore, whether the ghost is set with respect to the caller ID may be determined.

When the determining of operation 203 determines that the ghost is set, the ghost register processing apparatus determines whether a reception rejection is set in operation 205.

When the determining of operations 203 and 205 determines that the ghost is set and the reception rejection is set, the ghost register processing apparatus stores reception information with respect to the caller ID in a ghost memory unit in operation 207.

In this case, the ghost register processing apparatus may store, in the ghost memory unit, reception history or received contents with respect to the call request or the message reception as reception information. The ghost register processing apparatus may control to abstain from displaying the reception information associated with the caller ID stored in the ghost memory unit or may control to inactivate a notification function with respect to the reception information. This may be performed to protect the reception information with respect to a ghost register.

In operation 209, the ghost register processing apparatus determines whether a call neglect is set with respect to the caller ID when the determining in operation 205 determines that the reception rejection is not set.

When the determining in operation 209 determines that the call neglect is set, the ghost register processing apparatus may determine whether a current time is corresponding to a call neglect set time in operation 211. The register ghost processing apparatus may store the reception information of the caller ID in the ghost memory unit when the current time is corresponding to the call neglect set time.

When the determining in operation 203 determines that the ghost is not set, when the determining in operation 209 determines that the call neglect is not set, or when the determining in operation 211 determines that the current time is not corresponding to the call neglect set time, the ghost register processing apparatus may store the reception information of the caller ID in the basic memory unit in operation 213.

In this case, the register ghost processing apparatus may control to display the reception information of the caller ID stored in the basic memory unit or may control to activate the notification function with respect to the reception information, unlike controlling to inactivate the notification function with respect to the reception information of the caller ID stored in the ghost memory unit.

The ghost register processing apparatus may search an address database for a ghost register recorded as a character string identical with an inputted character string, in response to a register search request, excluding a register including a portion of the character string, and may control to display information associated with the retrieved ghost register. Here, information associated with a register may include at least one among a name of the register, a phone number, information associated with whether a ghost is set, information associated with whether a reception rejection is set, information associated with a call neglect is set, and a call neglect set time.

For example, the ghost register processing apparatus may search the address database for a ghost register 'Hong Gil Dong' recorded as a character string identical with an inputted 'Hong Gil Dong', in response to the register search request, and may control to display information associated with the retrieved ghost register 'Hong Gil Dong'.

In a case where the ghost is set with respect to the 'Hong Gil Dong', the ghost register processing apparatus may control to display the information associated with the ghost register 'Hong Gil Dong' only when a character string identical with the 'Hong Gil Dong' is inputted. However, in a case where the ghost is not set with respect to the 'Hong Gil Dong', the ghost register processing apparatus may control to display information associated with a register 'Hong Gil Dong' even when a portion of the character string is inputted.

Specifically, in the case where the ghost is set with respect to the 'Hong Gil Dong', the register ghost processing apparatus may control to display the information associated with the ghost register 'Hong Gil Dong' only when the 'Hong Gil Dong' is inputted, and may control to abstain from displaying the information associated with the ghost register when 'Gil Dong' or 'HGD' is inputted. However, in the case where the ghost is not set with respect to the 'Hong Gil Dong', the register ghost-processing unit may control to display the information associated with the register 'Hong Gil Dong', even when 'Gil Dong' or 'HGD' is inputted in addition to the 'Hong Gil Dong'.

When a ghost is set and a reception rejection is set, or when a current time is corresponding to a call neglect set time in a case where the ghost is set, the reception rejection is not set, and a call neglect is set, the register ghost-processing method according to an embodiment may store reception information with respect to a caller ID. However, the register ghost-processing method may not be limited thereto. For example, when a ghost is set, the register ghost-processing method according to an embodiment may store reception information associated with a caller ID in a ghost memory unit, and may control to abstain from displaying information stored in the ghost memory unit, and thus, may protect reception information with respect to a ghost register.

The method according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few exemplary embodiments of the present invention have been shown and described, the present invention is not limited to the described exemplary embodiments.

Instead, it would be appreciated by those skilled in the art that changes may be made to these exemplary embodiments without departing from the principles and spirit of the invention, the scope of which is defined by the claims and their equivalents.

What is claimed is:

1. An apparatus of processing a ghost register, the apparatus comprising:
    a ghost setting determining unit to determine whether a ghost is set with respect to a caller identification (ID) that is received in response to a call request or a message reception; and
    a reception information controller to store reception information associated with the caller ID in a ghost memory unit when the ghost setting determining unit determines that the ghost is set, wherein the reception information controller controls to abstain from displaying the reception information stored in the ghost memory unit,
    wherein the ghost register is accessible by inputting a character string identical to a character string of the ghost register.

2. The apparatus of claim 1, further comprising:
    a reception rejection determining unit to determine whether a reception rejection is set with respect to the caller ID,
    wherein, when the ghost is set with respect to the caller ID and the reception rejection is set with respect to the caller ID, the reception information controller stores the reception information in the ghost memory unit.

3. The apparatus of claim 1, further comprising:
    a reception rejection determining unit to determine whether a reception rejection is set with respect to the caller ID; and
    a call neglect determining unit to determine whether a call neglect is set with respect to the caller ID, when the ghost is set with respect to the caller ID and the reception rejection is not set with respect to the caller ID,
    wherein, when the call neglect is set with respect to the caller ID and a current time is corresponding to a call neglect set time, the reception information controller stores the reception information.

4. The apparatus of claim 1, wherein the ghost setting determining unit searches an address database to determine whether the ghost is individually set with respect to the caller ID, or searches the address database to determine whether the caller ID is included in a group to which the ghost is set.

5. The apparatus of claim 1, wherein the reception information controller stores, in the ghost memory unit, reception history or received contents with respect to the call request or the message reception as the reception information.

6. The apparatus of claim 1, further comprising:
    a search controller to control to search an address database for a ghost register recorded as a character string identical with a character string inputted through an interface, in response to a register search request, excluding a register including a portion of the character string, and to control to display information associated with the retrieved ghost register.

7. The apparatus of claim 1, wherein, when the determining determines that the ghost is not set, the reception information controller stores the reception information in a basic memory unit different from the ghost memory unit.

8. A method of processing a ghost register, the method comprising:
    determining whether a ghost is set with respect to a caller ID received in response to a call request or a message reception;
    storing reception information with respect to the caller ID in a ghost memory unit when the determining determines that the ghost is set; and
    controlling to abstain from displaying the reception information stored in the ghost memory unit,
    wherein the ghost register is accessible by inputting a character string identical to a character string of the ghost register.

9. The method of claim 8, further comprising:
    determining whether a reception rejection is set with respect to the caller ID,
    wherein, when the ghost is set with respect to the caller ID and the reception rejection is set with respect to the caller ID, the storing stores the reception information in the ghost memory unit.

10. The method of claim 8, further comprising:
    determining whether a reception rejection is set with respect to the caller ID; and
    determining whether a call neglect is set with respect to the caller ID, when the ghost is set with respect to the caller ID and the reception rejection is not set with respect to the caller ID,
    wherein, when the call neglect is set with respect to the caller ID and a current time is corresponding to a call neglect set time, the storing stores the reception information.

11. The method of claim 8, wherein the determining comprises searching an address database to determine whether the ghost is individually set with respect to the caller ID, or searches the address database to determine whether the caller ID is included in a group to which the ghost is set.

12. The method of claim 8, wherein the storing comprises storing, in the ghost memory unit, reception history or received contents with respect to the call request or the message reception as the reception information.

13. The method of claim 8, further comprising:
    controlling to search an address database for a ghost register recorded as a character string identical with a character string inputted through an interface, in response to a register search request, excluding a register including a portion of the character string, and to display information associated with the retrieved ghost register.

14. The method of claim 9, further comprising:
    storing the reception information in a basic memory unit different from the ghost memory unit when the determining determines that the ghost is not set.

* * * * *